US012806845B2

(12) United States Patent
Kastner

(10) Patent No.: US 12,806,845 B2
(45) Date of Patent: Nov. 24, 2026

(54) METHOD AND SYSTEM FOR THE FILTRATION OF LIQUIDS AND/OR MELTS

(71) Applicant: Next Generation Analytics GmbH, Grieskirchen (AT)

(72) Inventor: Friedrich Kastner, Grieskirchen (AT)

(73) Assignee: Next Generation Analytics GmbH, Grieskirchen (AT)

( * ) Notice: Subject to any disclaimer, the term of this patent is extended or adjusted under 35 U.S.C. 154(b) by 394 days.

(21) Appl. No.: 18/696,455

(22) PCT Filed: Sep. 26, 2022

(86) PCT No.: PCT/EP2022/076694
§ 371 (c)(1),
(2) Date: Mar. 28, 2024

(87) PCT Pub. No.: WO2023/057252
PCT Pub. Date: Apr. 13, 2023

(65) Prior Publication Data

US 2024/0383186 A1 Nov. 21, 2024

(30) Foreign Application Priority Data

Oct. 4, 2021 (DE) ..................... 10 2021 125 712.3

(51) Int. Cl.
*B29C 48/693* (2019.01)
*B29C 48/692* (2019.01)
*B29C 48/92* (2019.01)

(52) U.S. Cl.
CPC .......... *B29C 48/692* (2019.02); *B29C 48/693* (2019.02); *B29C 48/92* (2019.02);
(Continued)

(58) Field of Classification Search
CPC ..... B29C 48/692; B29C 48/693; B29C 48/92; B29C 2948/92019; B29C 2948/9238
See application file for complete search history.

(56) References Cited

U.S. PATENT DOCUMENTS 3,583,453 A 6/1971 Upmeier
11,148,340 B2 * 10/2021 Prinzo ................ B29C 48/2554

FOREIGN PATENT DOCUMENTS

DE 1 131 875 B 6/1962
DE 17 29 396 A 3/1972
(Continued)

OTHER PUBLICATIONS

International Search Report in PCT/EP2022/076694, mailed Jan. 26, 2023.

*Primary Examiner* — In Suk C Bullock
*Assistant Examiner* — Bachar El Haj Hassan
(74) *Attorney, Agent, or Firm* — Collard & Roe, P.C.

(57) ABSTRACT

A method and a filtration system filter liquids and/or melts. The filtration system includes a housing with a supply channel, a discharge channel and a first and second filter device. Each of the filter devices has a filter element passed through a filter chamber, which is held clamped by clamping devices. Each of the clamping devices includes interacting clamping elements and actuating elements, wherein the clamping elements are guided in a normal direction onto a flat side of the respective filter element in an adjustable manner relative to the housing. Clamping element contact surfaces and actuating element contact surfaces are respectively aligned opposite to one another and have an oblique longitudinal alignment with respect to the flat side of the respective filter element.

30 Claims, 5 Drawing Sheets

Figure 1:
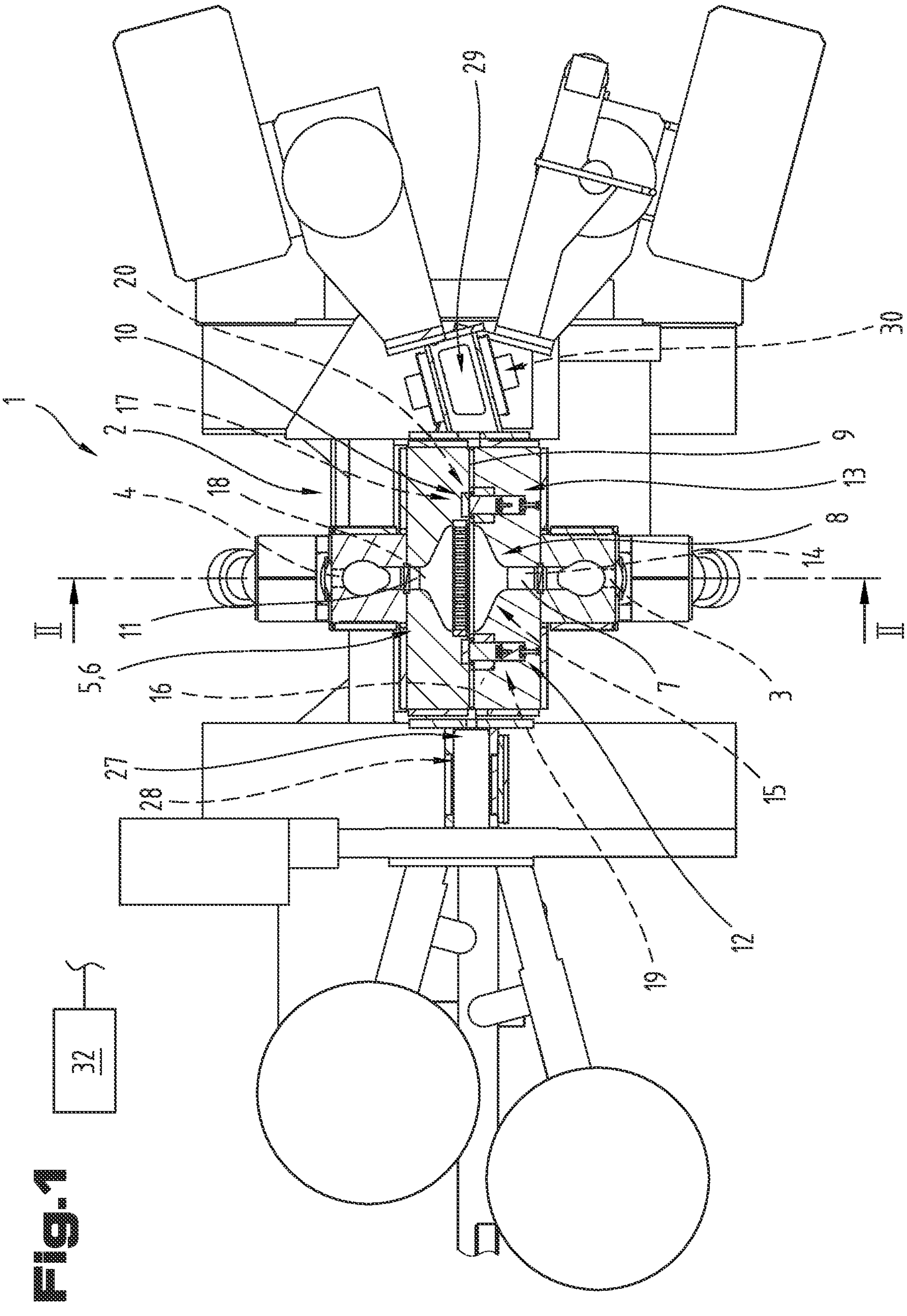

(52) U.S. Cl.
CPC ............... *B29C 2948/92019* (2019.02); *B29C 2948/9238* (2019.02)

(56) References Cited

FOREIGN PATENT DOCUMENTS

| | | | | |
|---|---|---|---|---|
| DE | 20 49 879 | A1 | 4/1972 | |
| DE | 197 22 352 | A1 | 11/1997 | |
| DE | 102 14 013 | A1 | 10/2003 | |
| DE | 10 2008 014 054 | A1 | 9/2009 | |
| EP | 0 275 462 | A2 | 7/1988 | |
| EP | 0 976 525 | A1 | 2/2000 | |
| EP | 2789447 | A1 * | 10/2014 | ......... B29C 48/2725 |
| EP | 2 789 447 | B1 | 11/2018 | |
| GB | 1 340 233 | A | 12/1973 | |
| WO | 2017/163180 | A1 | 9/2017 | |

* cited by examiner

METHOD AND SYSTEM FOR THE FILTRATION OF LIQUIDS AND/OR MELTS

CROSS REFERENCE TO RELATED APPLICATIONS

This application is the National Stage of PCT/EP2022/076694 filed on Sep. 26, 2022, which claims priority under 35 U.S.C. § 119 of German Application No. 10 2021 125 712.3 filed on Oct. 4, 2021, the disclosure of which is incorporated by reference. The international application under PCT article 21(2) was not published in English.

The invention relates to a method and a system for the filtration of liquids and/or melts.

WO 2017/163180 A1 describes a filtration device for extrusion processes without interruptions. In an extrusion process of plastic materials to be regenerated with a high content of impurities, a filter device is used whose function is to remove all the impurities present in the material before the final product is obtained. The filtration device comprises a material inlet channel which is divided into a first inlet channel and a second inlet channel, the first inlet channel leading to a first filter chamber and the second inlet channel leading to a second filter chamber. The first filter chamber is provided with a first outlet channel at its outlet and the second filter chamber is provided with a second outlet channel at its outlet. The outlet channels in turn merge into a common channel, which is suitable for conveying the material to an extrusion head. Cylindrical locking elements are provided to clamp the filter belts. A flow valve is arranged in each of the inlet channels and also in each of the outlet channels in order to prevent the plastic material from flowing through for this period of time when the filter is changed. When the filter belts are clamped, a relative change in their position in relation to the filter housing could also occur here.

DE 197 22 352 A1 describes a discontinuous, automatically operating sieve changer for filtering polymeric, elastomeric and other filterable materials. The filter strip is guided through the sieve changer by the discharge roller and clamped in the clamping of the drive shaft for the filter strip. The drive shaft and the two sealing shafts are connected by two intermediate pinions so that the sealing shafts are driven synchronously by the drive shaft. The material to be filtered presses the fine sieve onto a support sieve, which is supported on a perforated disk. The increase in contamination is detected by the pressure measurement. When a predetermined value is reached, the drive shaft is rotated by ⅓ of a turn while at the same time releasing the clamping of the sealing shafts. The fine sieve has now been pulled through the housing by the amount of the ⅓ of a turn so that pressure can be reduced by the clean filter surface. Instead of the two sealing shafts, clamping bars can also be provided on both sides, each with a wedge surface, which can be moved towards each other by means of a toggle lever arrangement. When the filter strip is clamped, it can change its position with respect to the filter housing.

EP 2 789 447 B1 describes an automatic sieve changer device, particularly suitable for use on systems for the production, processing, recycling and treatment of thermoplastic materials, which is connected downstream of an extruder. The sieve changer device comprises a frame, two opposing side plates attached to the frame and provided with an inlet port and a pair of inlet channels and an outlet port and a pair of outlet channels. Between each of the inlet channels and each of the outlet channels, there is a sieve unit with a filter belt that can be passed through the respective chamber. A clamping wedge with a through-hole passed through it, which can be adjusted in the direction of the adjustment movement of the filter belt, is provided for clamping and holding the filter belt. The respective clamping wedge is accommodated in its own plate located between the opposing side plates, which can also be adjusted in the direction of the adjustment movement of the filter belt. By relative displacement of the respective plate with respect to the opposite side plates, it was possible to interrupt the melt flow to the chamber in the plate, allowing the filter belt to continue moving and the filter to be changed. Here too, clamping the respective filter belts could result in a relative change in their position in relation to the respective plate.

The object of the present invention was to overcome the disadvantages of the prior art and to provide a method and a device by means of which a user is able to carry out a continuous filtering process at a constant pressure level over a long period of time. A further object is to keep the respective filter elements clamped in a stationary manner in their filtration position without relative displacement during the clamping process.

These objects are solved by a method and a filtration system according to the claims. The method according to the invention is used for the filtration of liquids and/or melts with a wide variety of impurities still contained therein by means of a filtration system and thus for filtering a flowable material. In the method, at least the following are carried out:

- providing a housing with a common supply channel and a common discharge channel,
- providing a first filter device with a first inlet channel, a first filter chamber, a band-shaped first filter element passed through the first filter chamber, a first clamping unit and a first outlet channel, wherein the first inlet channel is in flow connection with the common supply channel and the first outlet channel is in flow connection with the common discharge channel, and wherein the first filter element, viewed in the adjustment direction of the first filter element, is held clamped on both sides of the first filter chamber by means of a first and second clamping device of the first clamping unit,
- providing a second filter device with a second inlet channel, a second filter chamber, a band-shaped second filter element passed through the second filter chamber, a second clamping unit and a second outlet channel, wherein the second inlet channel is in flow connection with the common supply channel and the second outlet channel is in flow connection with the common discharge channel, and wherein the second filter element, viewed in the adjustment direction of the second filter element, is held clamped on both sides of the second filter chamber by means of a third and fourth clamping device of the second clamping unit,
- providing the liquid and/or melt to be filtered in a flowable aggregate state and feeding the liquid and/or melt into the common supply channel, wherein the liquid and/or melt is conveyed through at least one of the filter devices to the common discharge channel and being filtered in the process, wherein it is further provided
- that each of the clamping devices of the first clamping unit and the second clamping unit comprises a clamping element and an actuating element interacting therewith,
- that each of the clamping elements is guided in a normal direction onto a flat side of the respective filter element in an adjustable manner relative to the housing and is arranged in a transverse orientation with respect to the adjustment direction of the respective filter element, that each of the actuating elements is guided in a parallel direction with respect to the flat side of the respective filter element in an adjustable manner relative to the housing and is also arranged in a transverse orientation with respect to the adjustment direction of the respective filter element, that the clamping elements each have a clamping element contact surface on their side facing the respective actuating element, that the actuating elements each have an actuating element contact surface on their side facing the respective clamping element, that the respectively interacting and mutually facing clamping element contact surfaces and actuating element contact surfaces are aligned opposite to one another and the respective clamping element contact surfaces and the actuating element contact surfaces furthermore have an oblique longitudinal orientation with respect to the flat side of the respective filter element, and that upon a relative adjustment of the actuating element in a first adjustment direction with respect to the clamping element interacting therewith, the clamping element is pressed against the housing into a clamping position resting against the respective filter element and in a second adjustment direction of the actuating element, which is opposite to the first adjustment direction, the clamping element interacting therewith is adjusted into a release position for the respective filter element.

The advantage of the method steps selected here is that in the adjacent clamping position of the clamping elements of the individual clamping units with their clamping devices, a compressive force acting in normal orientation is always exerted on the respective filter element. Shearing forces on the respective filter element from each of the clamping devices are thus avoided. Due to the selection of the obliquely extending contact surfaces between the clamping element and the actuating element, there is always a mechanically based force transmission and deflection starting from the respective actuator or drive means to the actuating element and from there further to the clamping element. If a pressure loss occurs in the actuating element or a defect in the drive means occurs after the clamping position has been reached, the pressure force from the clamping element continuous to be exerted on the respective filter element. This avoids leakage problems in the area of the individual clamping devices and prevents the liquid and/or melt from escaping unintentionally. Furthermore, the relative displacement of the individual clamping elements exclusively in normal orientation with respect to the respective filter elements prevents unintentional displacement of the filter element in the respective clamping area.

Furthermore, a method is advantageous in which the interacting clamping elements and actuating elements are held and guided in a longitudinally adjustable manner against each other in the area of their clamping element contact surfaces and actuating element contact surfaces by means of a first guide arrangement. In this way, a joint adjustment and entrainment can be achieved between the respectively interacting clamping elements and actuating elements in both adjustment directions of the actuating elements.

A further advantageous method is characterized in that the respective actuating elements are held and guided in a longitudinally adjustable manner on the housing on their side facing away from the respective filter element by means of a second guide arrangement. In this way, a clear and secure relative mounting and guidance of the respective actuating element on the housing can be achieved.

A method variant in which the clamping elements, viewed towards their clamping surface facing the respective filter element, are circumferentially sealed against the housing is also advantageous. This enables circumferential sealing around the respective clamping element and prevents the liquid and/or melt from passing through to the respective actuating element.

Another method is characterized by the fact that each of the clamping devices of the clamping unit, in particular each of their actuating elements, is adjusted independently of one another between their clamping position and their release position. This enables an individual sequence of release and return to the clamping position. Furthermore, the change or renewal method of the respective active filter surface can also be precisely adjusted and controlled in this way.

Furthermore, a method is advantageous in which the respective filter chamber is sealed against the housing when the clamping elements are in the clamping position. This prevents the liquid and/or melt from escaping unintentionally from the respective filter chamber during filter operation.

A further advantageous method is characterized in that during filter operation of the filtration system, at least a proportion of 10% of the liquid and/or melt is always conveyed in one of the inlet channels and the remaining proportion is conveyed to 100% in the other inlet channel. By selecting a minimum proportion of liquid and/or melt, clumping or adjustment of one of the filter devices can be reliably prevented. Furthermore, the time of renewal or filter replacement can be set and determined differently between the two filter devices. Furthermore, pressure fluctuations after the passage of the liquid and/or melt through the respective filter chambers in the area of the common discharge channel can be minimized or completely prevented.

A method variant in which the following steps are carried out when renewing the active filter surface of one of the filter elements is also advantageous reducing the proportion of liquid and/or melt supplied into the respective filter chamber to a maximum of 2% of the total mass flow/volume flow or completely preventing the supply of liquid and/or melt into the respective filter chamber, adjusting the respective clamping device of the respective clamping unit in its release position, moving the respective filter element in its adjustment direction by a predetermined adjustment range through the respective filter chamber, adjusting one of the two clamping devices of the respective clamping unit in its clamping position, pretensioning the respective filter element with a predetermined tensile force in the direction of the other of the two clamping devices of the respective clamping unit, adjusting the other of the two clamping devices of the respective clamping unit in its clamping position, and releasing the supply of the liquid and/or melt into the respective filter chamber with the renewed filter surface of the respective filter element.

The advantage of these method steps is that a predetermined pretension of the respective filter element can be built up and maintained in the course of the filter change or the renewal of the active filter surface. By positioning the respective filter element in a stationary position in the area of one of the two clamping devices, the filter element can be held immovably and only after the predetermined tensile force and associated pretension have been reached can clamping take place in the area of the other clamping device.

A further advantageous embodiment of the method is when the reduction of the proportion of liquid and/or melt fed into the respective filter chamber is effected by actuators in each of the inlet channels and/or in each of the outlet channels or by a control valve in the transition section to the first inlet channels.

The advantage here is that the actuators and/or the control valve can be used to reduce the proportion of liquid and/or melt fed into the respective filter chamber, either to relieve the filter device by reducing the pressure, to use the filter device evenly in order to avoid excessive contamination of a filter device, but in particular to control the flow of liquid and/or melt through the two filter devices in such a way that both do not have to be renewed or changed at the same time, which would result in the filtration system being switched off and the liquid and/or melt coming to a standstill.

Ideally, either a control valve is used in the transition section or actuators in the inlet or outlet channels. However, it is also conceivable that the control valve and actuators are used together and then used alternatively or together.

A method in which the actuators and/or the control valve are controlled by a control device is also advantageous.

The advantage here is that the control device can adjust the actuators and/or the control valve automatically and possibly also more precisely compared to manual operation, which can save time, costs and material and at the same time reduce the risk for the system and the operators.

Another method is characterized by determining and/or monitoring the tensile force applied to the respective filter element when renewing its active filter surface. This can prevent overstretching or a filter element that is too loose in the filter chamber.

Furthermore, a method is advantageous in which the respective filter element is heated to a temperature value selected from a temperature value range with a lower limit of 20 °C above room temperature, in particular the melting temperature of the respective melt, and an upper limit of 400 °C, in particular the respective processing temperature or slightly above the respective processing temperature, before it is fed into the respective filter chamber, in particular before its active filter surface is renewed. By bringing the temperature to a predetermined value, unwanted adhesion or partial cooling of the liquid and/or melt can be achieved immediately after the filter change.

A further advantageous method is characterized in that the respective filter element, in particular after the renewal of its active filter surface, is heated to a temperature value selected from a temperature value range with a lower limit of 20 °C above room temperature, in particular the melting temperature of the respective melt, and an upper limit of 400 °C, in particular the respective processing temperature or slightly above the respective processing temperature, after being passed through the respective filter chamber. This prevents the respective filter element from cooling down too quickly after the filter change before it is wound onto a winding device.

A method variant in which the pressure built up in the liquid and/or melt is determined by pressure sensors in each of the inlet channels and/or in each of the filter chambers on the side facing the respective inlet channel is also advantageous. This allows the pressure conditions prevailing in the respective filter device to be determined and, depending on this, the filter change or renewal of the active filter surface can be planned and carried out.

A further embodiment provides that the control device is configured to monitor the pressures determined by the pressure sensors and to control the actuators and/or the control valve in such a way that the pressures remain within predetermined limits.

This can advantageously ensure that the pressure in the inlet channels, for example, does not become too high, which could have a negative effect on the filter devices and/or the liquid and/or melt. Alternatively or additionally, it can be ensured that the pressure does not become too low, which could also have a negative effect on the liquid and/or melt.

An advantageous embodiment provides that the control device is configured, using machine learning on the basis of the pressures determined by the pressure sensors, material parameters of the liquid and/or melt to be processed, and control parameters of the actuators and/or the control valve, to proactively control the actuators and/or the control valve in such a way that the pressures remain within predetermined limits.

The advantage here is that machine learning can be used to track changes in the pressures and, based on previous observations, the actuators and/or the control valve can be controlled proactively when an undesirable pressure starts to build up so that the pressures do not exceed or fall below the limit values. Ideally, the pressures can thus be kept close to the optimum values for filtering.

Another advantageous embodiment provides that the liquid or the melt is a polymer, in particular a plastic, and/or a pasty material. The material can also be a melted secondary plastic material in particular.

The proposed inventive method is particularly advantageous when applied to such a polymer or pasty material, or secondary plastic material, since here a standstill and/or cooling of the material has particularly large effects, such as the solidification of the material and the associated cleaning effort.

However, the object of the invention is also solved independently of this by a filtration system according to the features stated therein. The filtration system is used for the filtration of liquids and/or melts with a wide variety of impurities still contained therein, the filtration system comprises

- a housing with a common supply channel and a common discharge channel,
- a first filter device with a first inlet channel, a first filter chamber a band-shaped first filter element passed through the first filter chamber, a first clamping unit and a first outlet channel, wherein the first inlet channel is in flow connection with the common supply channel and the first outlet channel is in flow connection with the common discharge channel, and wherein the first filter element, viewed in the adjustment direction of the first filter element, is held clamped as required on both sides of the first filter chamber by means of a first and second clamping device of the first clamping unit,
- a second filter device with a second inlet channel, a second filter chamber, a band-shaped second filter element passed through the second filter chamber, a second clamping unit and a second outlet channel, wherein the second inlet channel is in flow connection with the common supply channel and the second outlet channel is in flow connection with the common discharge channel, and wherein the second filter element, viewed in the adjustment direction of the second filter element, is held clamped as required on both sides of the second filter chamber by means of a third and fourth clamping device of the second clamping unit, with further provision being made that each of the clamping devices of the first clamping unit and of the second clamping unit comprises a respective clamping element and a respective actuating element interacting therewith, that each of the clamping elements is guided in a normal direction onto a flat side of the respective filter element in an adjustable manner relative to the housing and is arranged in a transverse orientation with respect to the adjustment direction of the respective filter element, that each of the actuating elements is guided in a parallel direction with respect to the flat side of the respective filter element so as to be adjustable relative to the housing and is also arranged in a transverse orientation with respect to the adjustment direction of the respective filter element, that the clamping elements each have a clamping element contact surface on their side facing the respective actuating element, that the actuating elements each have an actuating element contact surface on their side facing the respective clamping element, that the respectively interacting and mutually facing clamping element contact surfaces and actuating element contact surfaces are aligned opposite to one another and the respective clamping element contact surfaces and the actuating element contact surfaces furthermore have an oblique longitudinal orientation with respect to the flat side of the respective filter element, and that when the actuating element is relatively adjusted in a first adjustment direction with respect to the clamping element interacting therewith, the clamping element is pressed against the housing into a clamping position resting against the respective filter element, and when the actuating element is adjusted in a second adjustment direction opposite to the first adjustment direction, the clamping element interacting therewith can be adjusted into a release position for the respective filter element.

The advantage of this is that in the adjacent clamping position of the clamping elements of the individual clamping units with their clamping devices, a compressive force is always exerted on the respective filter element in normal orientation. This avoids shearing forces on the respective filter element from each of the clamping devices. Due to the selection of the oblique contact surfaces between the clamping element and the actuating element, force is always transmitted and redirected on a mechanical basis from the respective actuator or drive means to the actuating element and from this further to the clamping element. If a pressure loss occurs in the actuator or a defect occurs in the drive means after the clamping position has been reached, the pressure force is still exerted on the respective filter element from the clamping element. This prevents leakage problems in the area of the individual clamping devices and prevents the liquid and/or melt from escaping unintentionally. Furthermore, the relative adjustment of the individual clamping elements exclusively in normal alignment with respect to the respective filter elements prevents unintentional displacement of the filter element in the respective clamping area.

Furthermore, it can be advantageous if the interacting clamping elements and actuating elements are held and guided in a longitudinally adjustable manner against each other in the area of their clamping element contact surfaces and actuating element contact surfaces by means of a first guide arrangement. In this way, a common adjustment and entrainment can be achieved between the respectively interacting clamping elements and actuating elements in both adjustment directions of the actuating elements.

Another embodiment is characterized by the fact that the respective actuating elements are held and guided in a longitudinally adjustable manner on the housing on the side facing away from the respective filter element by means of a second guide arrangement. In this way, a clear and secure relative mounting and guidance of the respective actuating element on the housing can be achieved.

A further possible embodiment has the features that the clamping elements, viewed towards their clamping surface facing the respective filter element, are circumferentially sealed against the housing. This enables circumferential sealing around the respective clamping element and prevents the liquid and/or melt from passing through to the respective actuating element.

A further embodiment provides that each of the clamping devices of the clamping unit, in particular each of its actuating elements, is in drive connection with its own actuating drive. This enables an individual sequence of release and return to the clamping position. Furthermore, the change or renewal procedure of the respective active filter surface can also be precisely adjusted and controlled in this way.

A further embodiment provides that the filtration system further comprises actuators in each of the inlet channels and/or in each of the outlet channels and/or a control valve in the transition section to the first inlet channels, and that the actuators and/or the control valve can limit the proportion of liquid and/or melt fed into the respective filter chamber.

Here, the advantage is that the actuators and/or the control valve can be used to reduce the proportion of liquid and/or melt fed into the respective filter chamber, either to relieve the filter device by reducing the pressure, to use the filter device evenly in order to avoid excessive contamination of a filter device, but in particular to control the flow of liquid and/or melt through the two filter devices in such a way that both do not have to be renewed or changed at the same time, which would result in the filtration system being switched off and the liquid and/or melt coming to a standstill.

Ideally, either a control valve is used in the transition section or actuators in the inlet or outlet channels. However, it is also conceivable that the control valve and actuators are used together and then used alternatively or together.

Another embodiment provides that the filtration system further comprises a control device that controls the actuators and/or the control valve.

The advantage here is that the control device can adjust the actuators and/or the control valve automatically and possibly also more precisely compared to manual operation, which can save time, costs and material and at the same time reduce the risk for the system and the operators.

Another embodiment is characterized in that a first heating device is provided for each of the filter elements, and each of the first heating devices is arranged upstream of the respective filter chamber when viewed in the adjustment direction of the respective filter element. By bringing it to a predetermined temperature value, unwanted adhesion or partial cooling of the liquid and/or melt can be achieved immediately after the filter change.

A further preferred embodiment is characterized in that a second heating device is provided for each of the filter elements, and each of the second heating devices is arranged downstream of the respective filter chamber as viewed in the adjustment direction of the respective filter element. This prevents the respective filter element from cooling down too quickly after the filter change before winding it on a winding device.

Furthermore, it can be advantageous if at least one pressure sensor is arranged or accommodated in each of the inlet channels and/or in each of the filter chambers on the side facing the respective inlet channel and the pressure sensors are configured to determine the pressure built up in the liquid and/or melt. This allows the pressure conditions prevailing in the respective filter device to be determined and, depending on this, the filter change or renewal of the active filter surface can be planned and carried out.

A further embodiment provides that the filtration system comprises a control device, and the control device is configured to monitor the pressures determined by the pressure sensors and to control the actuators and/or the control valve in such a way that the pressures remain within predetermined limits.

This can advantageously ensure that the pressure in the inlet channels, for example, does not become too high, which could have a negative effect on the filter devices and/or the liquid and/or melt. Alternatively or additionally, it can be ensured that the pressure does not become too low, which could also have a negative effect on the liquid and/or melt.

An advantageous embodiment provides that the filtration system comprises a control device, and the control device is configured using machine learning on the basis of the pressures determined by the pressure sensors, material parameters of the liquid and/or melt to be processed, and control parameters of the actuators and/or the control valve to proactively control the actuators and/or the control valve in such a way that the pressures remain within predetermined limits.

The advantage here is that machine learning can be used to track changes in the pressures and, based on previous observations, the actuators and/or the control valve can be controlled proactively when an undesirable pressure starts to build up so that the pressures do not exceed or fall below the limit values. Ideally, the pressures can thus be kept close to the optimum values for filtering.

Another advantageous embodiment provides that the liquid or the melt is a polymer, in particular a plastic, and/or a pasty material. The material can also be, in particular, a melted secondary plastic material.

The proposed inventive method is particularly advantageous when applied to such a polymer or pasty material, or secondary plastic material, since here a standstill and/or cooling of the material has particularly large effects, such as the solidification of the material and the associated cleaning effort.

For a better understanding of the invention, it is explained in more detail using the following figures.

Figure 2:
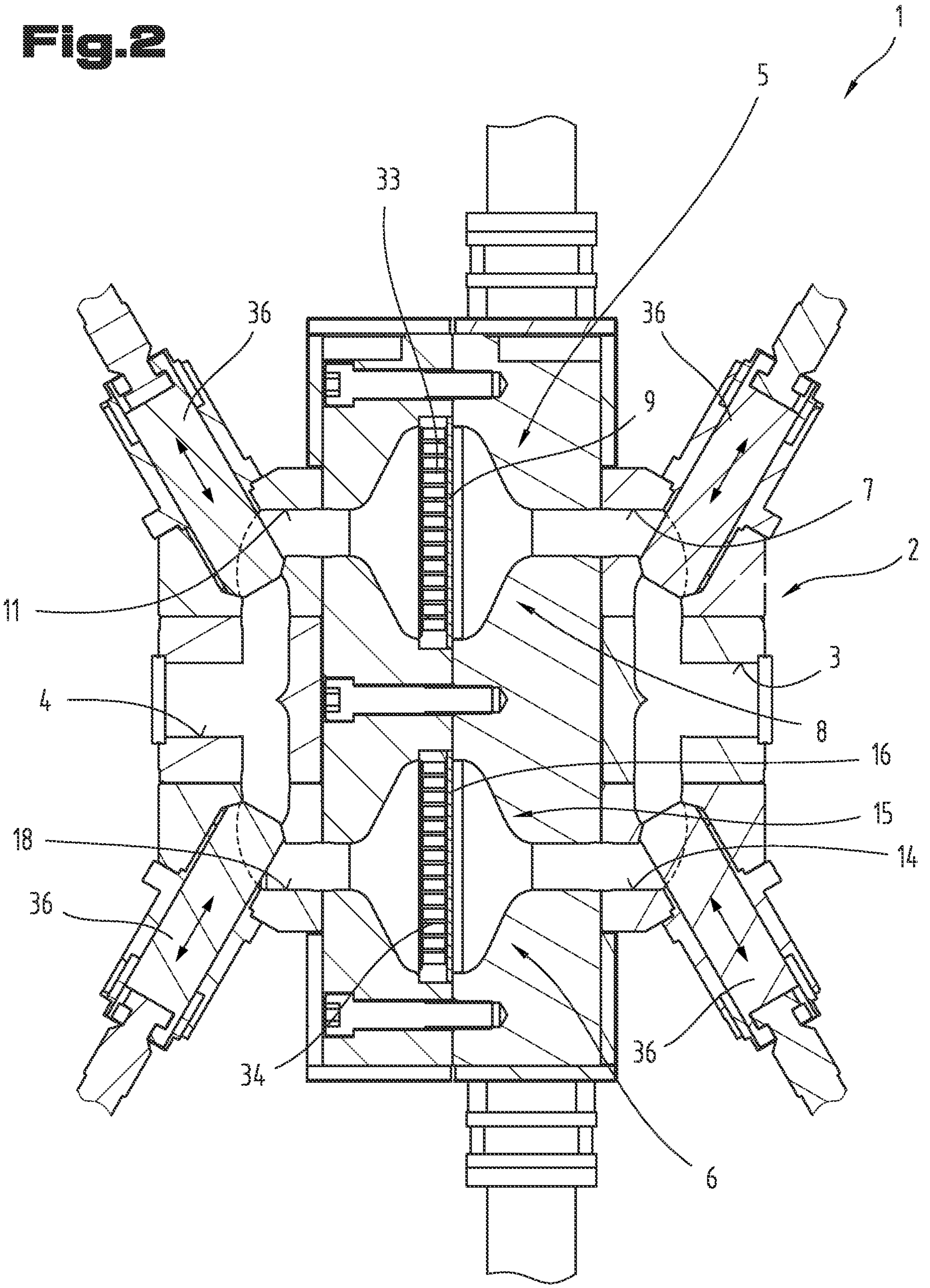
Figure 3:
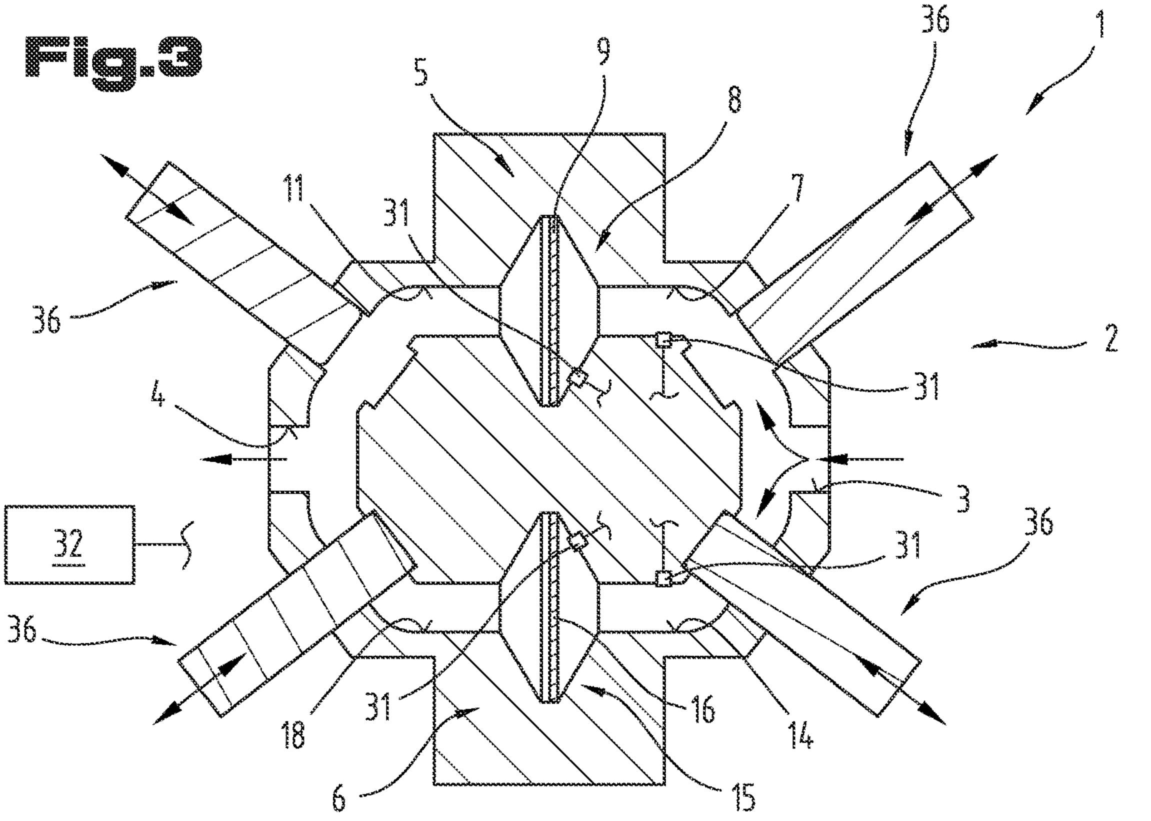
Figure 4:
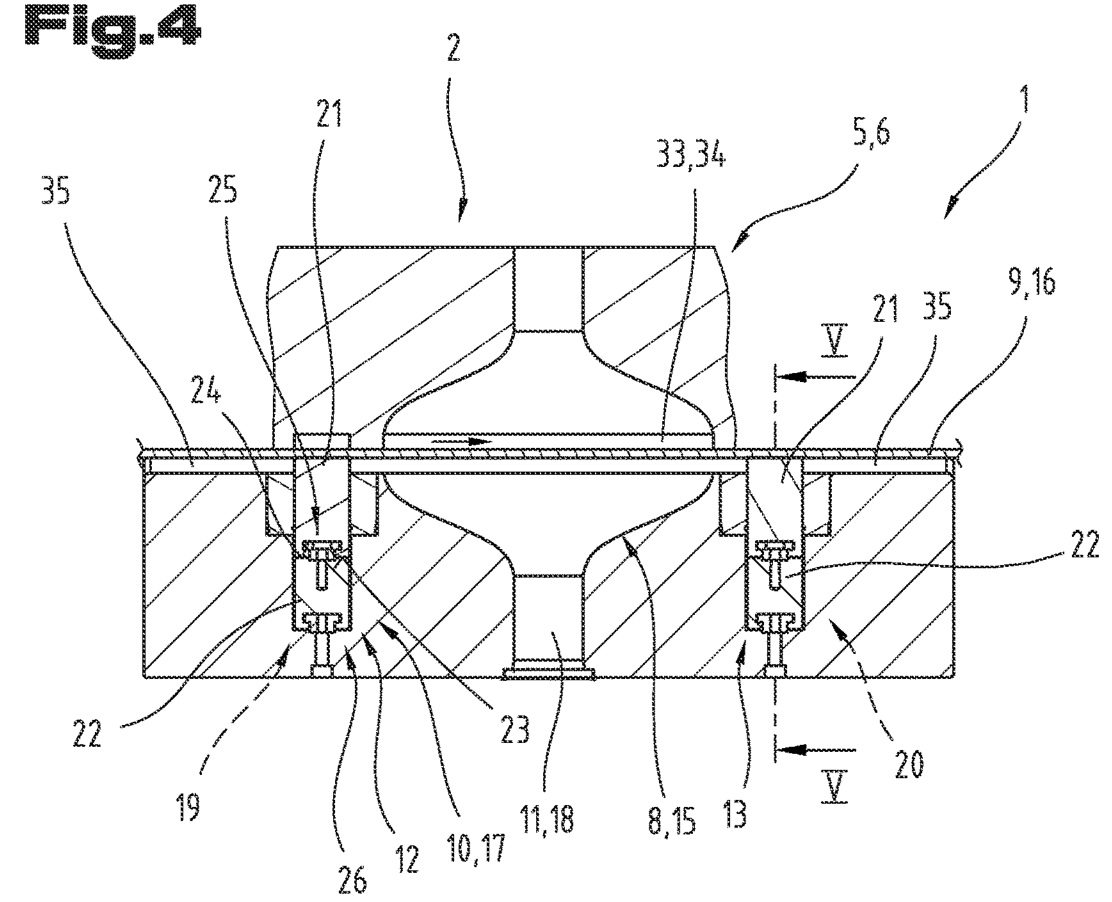
Figure 5:
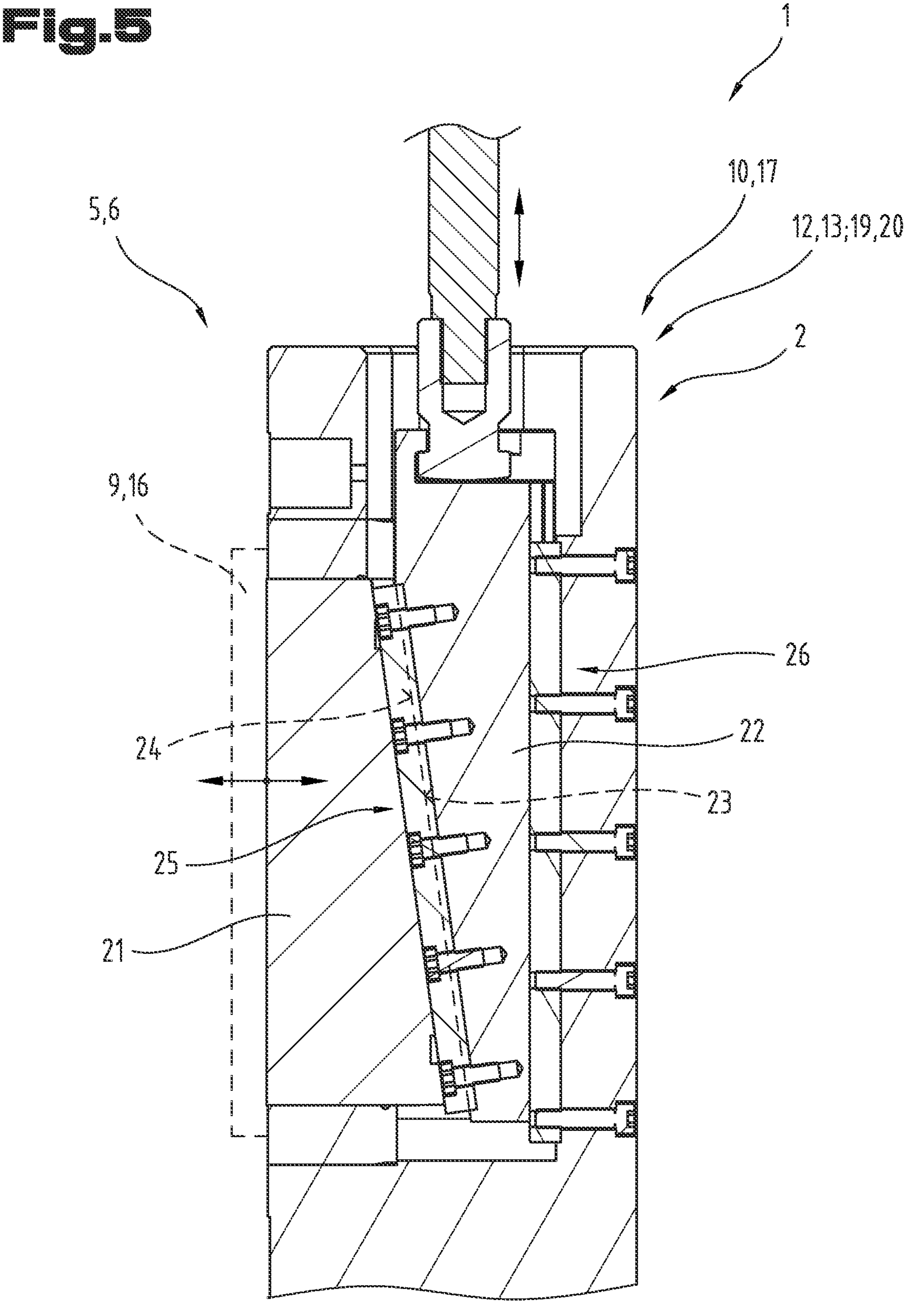
Figure 6:
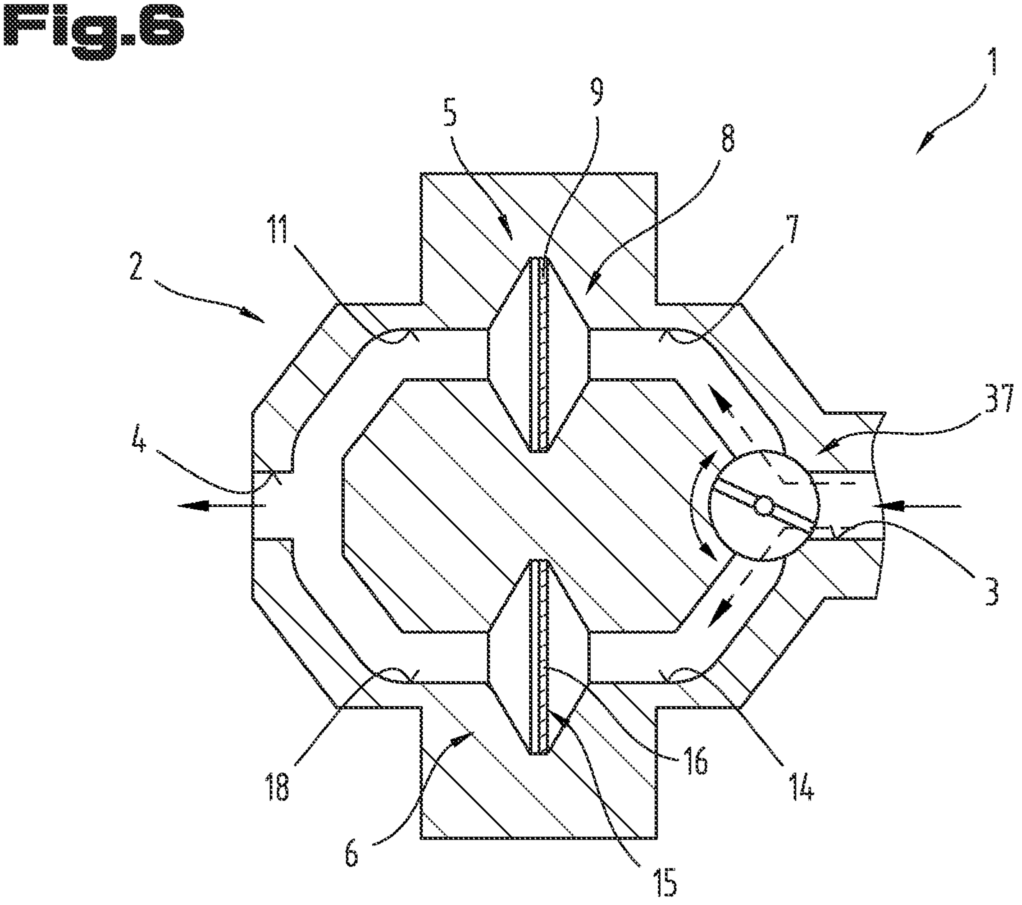

They show in a highly simplified, schematic representation:

FIG. 1 the filtration system cut in top view;

FIG. 2 the filtration system according to FIG. 1 with its two filter devices, each in the fully blocked position, cut in view along the lines II-II in FIG. 1;

FIG. 3 a schematic representation of the channel layout of the filtration system according to FIG. 2 with a filter device in the filter change position;

FIG. 4 the filtration system shown in FIGS. 1 to 3 with its clamping unit, in a plan view and enlarged view;

FIG. 5 one of the clamping devices of the clamping unit, cut in view along the lines V-V in FIG. 4;

FIG. 6 a further possible embodiment of the supply control of the liquid and/or melt to the two filter devices, in a schematically simplified representation.

By way of introduction, it should be noted that in the differently described embodiments, the same parts are provided with the same reference numbers or the same component designations, whereby the disclosures contained in the entire description can be transferred analogously to the same parts with the same reference numbers or the same component designations. The positional details selected in the description, such as top, bottom, side, etc., also refer to the directly described and illustrated figure and these positional details are to be transferred analogously to the new position in the event of a change in position.

In the following, the term "in particular" is understood to mean that it can be a possible more specialized embodiment or more detailed specification of an object or a method step, but does not necessarily have to represent a mandatory, preferred embodiment of the same or a mandatory procedure.

As used herein, the terms "comprising", "has", "having", "includes", "including", "contains", "containing" and any variations thereof are intended to cover non-exclusive inclusion.

The term "selectively" is also used. This is understood to mean that this method step or system component is available in principle, but can be used depending on the operating conditions, although this is not mandatory.

The liquid and/or melt to be filtered, e.g. a secondary plastic material, is, for example, a plastic material that has already been processed into a product at least once and is to be recycled. A secondary plastic material is separated by type, shredded if necessary, and then preferably transferred to the melt to be filtered in an extruder or similar melting system designed for this purpose. The material to be filtered can be fed as a liquid and/or melt to a filtration system 1 described below, in which the filtration method is carried out. The liquid and/or melt is in a flowable aggregate state for this purpose.

A secondary plastic material or the melt formed from it can be polycondensate melts in particular. In general, a secondary plastic material, or more generally a secondary raw material, is a raw material that is produced from disposed material by reprocessing, such as recycling. Such secondary materials can be used to manufacture new products. Primary raw materials, on the other hand, are so-called natural resources, i.e. substances taken from nature. Examples of such plastics include polyethylene terephthalate (PET), polytrimethylene terephthalate (PTT), polybutylene terephthalate (PBT), polyethylene naphthalate (PEN), polyethylene furanoate (PEF) and polyamides. The material polyethylene terephthalate (PET) can in particular be PET-C, which is semi-crystalline and forms a thin liquid melt. The PET-C melt has a low viscosity. Exemplary values of the intrinsic viscosity in the application of the present invention are between 0.45 and 1.2 dl/g.

Another application is, for example, the filtration of foodstuffs. This includes liquid foods with high viscosity, e.g. honey, tomato products, sauces, jams, corn and maple syrup, molasses, mustard, juices, fruit and vegetable concentrates; animal fats and highly viscous vegetable oils, lard, margarine, cocoa butter, peanut butter, vegetable fats and similar products. Filtration is also applicable to liquid foods with low viscosity, such as drinks, spirits, wine, ketchup, molasses, mustard, soy sauce, sugar syrup, vegetable oils, vinegar and water. Depending on their nature and/or temperature, the aforementioned goods can be classified as high or low viscosity foodstuffs.

In FIGS. 1 to 5 the filtration system 1 is shown in various views and detailed representations, whereby a stylized representation was also selected in some cases in order to improve clarity. The device for shredding and melting, i.e. for providing the liquid and/or melt, for example from a secondary plastic material, has also not been shown. Systems and devices from the known prior art can be used for this purpose.

The filtration system 1 basically comprises a housing 2 which preferably can be or is composed of several components. In the housing 2 shown in a simplified manner, at least one supply channel 3 and at least one discharge channel 4 is formed or arranged. Preferably, this is a common supply channel 3 and a common discharge channel 4. Furthermore, a first filter device 5 and a second filter device 6 are arranged or formed in the housing 2. The structure of the two filter devices 5, 6 is preferably selected to be basically identical to each other, whereby the respective components are described separately below for better differentiation. In principle, the two filter devices 5, 6 are arranged or formed parallel to each other. This can be one above the other or next to each other. In the present embodiment example, an arrangement is shown in which the two filter devices 5, 6 are arranged one above the other.

Starting from the supply channel 3, the first filter device 5 comprises a first inlet channel 7, a first filter chamber 8, a first filter chamber 8, a band-shaped first filter element 8 passed through the first filter chamber 9, a first clamping unit 10 and a first outlet channel 11. The filter element 9 can also be referred to as a belt filter or filter belt. The same also applies to the second filter element 16 described below. The first inlet channel 7 is in turn in flow connection with the common supply channel 3. The first outlet channel 11 connects to the first filter chamber 8 and is in flow connection with the common discharge channel 4. Furthermore, it is further indicated that the first filter element 9, viewed in the adjustment direction of the first filter element (9), is held clamped as required on both sides of the first filter chamber 8 by means of a first and second clamping device 12, 13 of the first clamping unit 10.

Also starting from the common supply channel 3, the second filter device 6, is also provided or arranged, which, viewed below in the direction of flow, also opens into the common discharge channel 4 and is in flow connection with it. The second filter device 6 comprises a second inlet channel 14, a second filter chamber 15, a band-shaped second filter element 16 passed through the second clamping chamber 15, a second clamping unit 17 and a second outlet channel 18. The second inlet channel 14 is in flow connection with the common supply channel 3 and the second outlet channel 18 is in flow connection with the common discharge channel 4. For clamping both sides of the second filter element 16, viewed in its adjustment direction, the second clamping unit 17 comprises its own third clamping device 19 and a fourth clamping device 20. By means of the two clamping devices 19, 20 of the second clamping unit 17, the second filter element 16 can be clamped or can be held clamped as required on both sides of the second filter chamber 15. This is done when the second filter device 6 is in filtration mode.

The liquid and/or melt provided and to be filtered is fed into the common supply channel 3 for the filtration process, whereby, depending on the selected operating mode of the filtration system 1 the liquid and/or melt is conveyed through at least one of the filter devices 5, 6 to the common discharge channel 4 and being filtered in the process. This is usually done by means of a conveying pressure that is built up, for example, by an extruder and/or a melt pump.

The two clamping devices 12, 13 of the first clamping unit 10 and the two clamping devices 19, 20 of the second clamping unit 17 are described together, as they each have the same structure. For this reason, in particular in FIGS. 4 and 5, identical components are always given the same reference number.

In this embodiment example shown, each of the clamping devices 12, 13 of the first clamping unit 10 and each of the two clamping devices 19, 20 of the second clamping unit 17 each comprises one clamping element 21 and an actuating element 22 interacting therewith. Each of the clamping elements 21 is guided in an adjustable manner in a normal direction onto a flat side of the respective filter element 9, 16 relative to the housing 2 and is furthermore arranged in a transverse orientation with respect to the adjustment direction or the longitudinal extent of the respective filter element 9, 16. The respective flat side of the filter element 9, 16 is that which also defines the filter surface in the respective filter device 5, 6.

Furthermore, each of the actuating elements 22 is guided in a parallel direction with respect to the flat side of the respective filter element 9, 16 in an adjustable manner relative to the housing 2 and is also arranged in a transverse orientation with respect to the adjustment direction of the respective filter element 9, 16. Furthermore, it is also provided that the interacting clamping elements 21 and actuating elements 22 each have interacting contact surfaces on their respective sides facing each other. The clamping elements 21 each have a clamping element contact surface 23 and the actuating elements 22 each have an actuating element contact surface 24 that runs in the opposite direction. Furthermore, the respective clamping element contact surfaces 23 and the actuating element contact surfaces 24 have an oblique longitudinal orientation with respect to the flat side of the respective filter element 9, 16. For mutual support and force transmission, a clamping element contact surface 23 rests on an actuating element contact surface 24 arranged opposite thereto.

The clamping element contact surfaces 23 and/or the actuating element contact surfaces 24 can be hardened and/or provided with hardened inserts in order to reduce wear during operation.

On the sides of the interacting clamping elements 21 and actuating elements 22 that face away from each other, these each have end faces that preferably run parallel to each other. That end face of the clamping elements 21 always faces the respective filter element 9, 16 and serves to clamp it against the housing 2. This can also be referred to as the clamping surface. That end face of the actuating element 22 is arranged on the side facing away from the respective actuating element 22 and can be supported on the housing 2 as required.

With a relative adjustment of the actuating element 22 in a first adjustment direction with respect to the interacting clamping element 21, the clamping element 21 is pressed against the housing 2 into a clamping position on the respective filter element 9, 16. With a second adjustment direction of the actuating element 22 opposite to the first adjustment direction, the clamping element 21 interacting therewith is adjusted into a release position for the respective filter element 9, 16. This is achieved by the selected wedge-shaped design of the respective clamping elements 21 and actuating element 22 on their sides facing each other.

The two adjustment directions of the actuating elements 22 and the clamping elements 21 are each indicated by a double arrow. The adjustment of the clamping elements 21 is effected by the relative adjustment of the actuating element 22 whereby the respective adjustment directions extending in a normal plane with respect to the flat side of the respective filter element 9, 16 and forming an angle of approximately 90° to each other. The force transmission originating from the respective actuating element 22 to the clamping element 21 interacting therewith takes place by means of a compressive force. If the gradient of the respective actuating elements 22 and the clamping elements 21 is chosen to be equal and opposite this is done by means of a tensile force. The actuating force applied in each case is deflected by an angle of 90°.

To ensure a safe adjustment movement of the clamping elements 21 in both adjustment directions, the interacting clamping elements 21 and actuating elements 22 can be or will be held and guided against each other in a longitudinally adjustable manner in the area of their mutually facing clamping element contact surfaces 23 and actuating element contact surfaces 24 by means of a first guide arrangement 25. This can be achieved, for example, by means of a T-slot guide or similar guide arrangements. In order to also be able to move the individual actuating elements 22 in a linear adjustment direction on the housing 2, the respective actuating elements 22 can be held and guided in a longitudinally adjustable manner on the housing 2 on their side facing away from the respective filter element 9, 16 by means of a second guide arrangement 26. This can also be achieved, for example, by means of a T-slot guide or similar guide arrangements.

In order to prevent or largely prevent an unintentional leakage of the liquid and/or melt from the respective filter chamber 8, 15 in the area of the individual clamping elements 21, at least in their adjacent clamping position on the respective filter element 9, 16, the clamping elements 21, viewed towards their clamping surface facing the respective filter element 9, 16, should be circumferentially sealed against the housing 2. Sealing elements not described in more detail can be provided for this purpose. When the clamping elements 21 are in the clamping position, this allows the respective filter chamber 8, 15 to be or become sealed against the housing 2.

The more detailed illustration of adjusting means or actuating drives for the respective actuating elements 22 has been omitted for the sake of clarity. It should be noted that all suitable devices from the known state of the art can be used for this purpose, such as cylinder-piston arrangements, electric actuating drives, linear drives or the like. Preferably, each of the individual actuating elements 22 of both the first clamping unit 10 as well as the second clamping unit 17 are each assigned their own actuating means or their own actuating drive, which is in drive connection with the respective actuating element 22. This creates the possibility that each clamping device 12, 13; 19, 20 of the clamping unit 10, 17, in particular each of their actuating elements 22, can be adjusted independently of one another between their clamping position and their release position.

For stationary filter operation or filtration operation of the filtration system 1, but not when renewing the active filter surface area, at least a proportion of 10% of the liquid and/or melt is always conveyed in one of the inlet channels 7, 14. The remaining proportion is conveyed to 100% of the liquid and/or melt in the other inlet channel 14, 7. With the previously specified proportion of 10% of the liquid and/or melt, this is 90% starting from the common supply channel 3. The specification of the proportion of liquid and/or melt can refer to the mass flow or the volume flow.

This selected minimum proportion of liquid and/or melt can prevent it from clumping or solidifying. Furthermore, the time at which the respective filter element 9, 16 is to be replaced or exchanged can also be offset between the two filter devices 5 and 6. FIG. 3 shows that the entire flow or the entire quantity of liquid and/or melt is supplied to the first filter device 5 shown here above and that the supply of liquid and/or melt is completely stopped in the second filter device 6 shown here below. This will be explained in more detail below.

When renewing the active filter surface of one of the filter elements 9, 16 that is in filter operation, the following steps should be carried out:

- reducing the proportion of liquid and/or melt supplied to the respective filter chamber 8, 15 to a maximum of 2% of the total mass flow/volume flow or completely preventing the supply of liquid and/or melt into the respective filter chamber 8, 15,
- adjusting the respective clamping devices 12, 13; 19, 20 of the respective clamping unit 10, 17 in their release position,
- moving the respective filter element 9, 16 in its adjustment direction by a predetermined adjustment range through the respective filter chamber 8, 15
- adjusting one of the two clamping devices 12, 13; 19, 20 of the respective clamping unit 10, 17 in their clamping position,
- pretensioning the respective filter element 9, 16 with a predetermined tensile force in the direction of the other of the two clamping devices 13, 12; 20, 19 of the respective clamping unit 17, 10,
- adjusting the other of the two clamping devices 13, 12; 20, 19 of the respective clamping unit 17,10 in its clamping position, and
- releasing the supply of liquid and/or melt into the respective filter chamber 8, 15 with the renewed filter surface of the respective filter element 9, 16.

In order to avoid unnecessary repetitions in the description, the renewal method of the active filter surface has been described for both of the filter devices 5 and 6. The renewal of the active filter surface is optionally only carried out for one of the filter devices 5 or 6 in order to be able to discharge or provide a uniform mass flow or a uniform volume flow of filtered liquid and/or melt at the common discharge channel 4.

Since, depending on the selected adjustment direction of the respective filter element 9, 16, the clamping of the respective filter element 9, 16 takes place first on one side of the respective filter chamber 8, 15, the respective filter element 9, 16 can be subjected to a predetermined pretensioning force and thus to tension. For this purpose, the tensile force applied to the respective filter element 9, 16 during the renewal of its active filter surface should also be determined and/or monitored.

It should be noted that the force applied by the clamping devices 12, 13; 19, 20 may depend on the contamination of the liquid and/or melt to be filtered. This force can be different for the two filter devices. The tensile stress caused by the liquid and/or melt to be filtered pressing on the filter device can be measured and thus the force to be applied can be adjusted. The advantage here is that, since the adjusted pressure allows the filter surface to be kept completely parallel to the cross-sectional area of the liquid and/or melt to be filtered, the clamping elements 21 only need to be opened very slightly in order to move the respective filter elements 9, 16. This reduces the escape of material from the filter chambers 8, 15, particularly in the case of very liquid materials. The tensile stress of the respective filter elements 9, 16 can therefore be controlled very precisely.

The position of the clamping elements 21 can be controlled so that their opening path is just large enough for the filter surface to be pulled through the resulting opening. From a defined point on the filter surface, e.g. at the beginning of the last third of the contaminated filter surface, the opening path or opening can be increased in order to remove all contaminants from the filter chamber. Especially with low-viscosity liquids, this control has the advantage that only a small amount of material escapes from the system during the filter surface change.

A further improved control is that the opening path of the clamping elements 21 takes place in a wave form, i.e. the opening gap is alternately switched back and forth between the smallest possible opening and the largest opening.

FIG. 1 also shows that in each of the filter devices 5 and 6 of the filtration system 1, a first heating device 27 and 28 can be provided for each of the filter elements 9, 16. The first heating devices 27 and 28, viewed in the adjustment direction of the respective filter element 9, 16, are arranged upstream of the respective filter chamber 8, 15. This makes it possible to place the respective filter element 9, 16, in particular before renewing its active filter surface to be heated to a temperature value selected from a temperature value range with a lower limit of 20 °C above room temperature, in particular the melting temperature of the respective melt, and an upper limit of 400 °C, in particular the respective processing temperature or slightly above the respective processing temperature, before feeding it into the respective filter chamber 8, 15. When recommissioning the respective filter device 5, 6, this preheating ensures that the liquid and/or melt to be filtered does not cool down when it first comes into contact with the renewed filter surface.

Furthermore, it can be advantageous if each of the filter devices 5 and 6 of the filtration system 1 is provided with a second heating device 29 and 30 for each of the filter elements 9 and 16. The second heating devices 29 and 30, viewed in the adjustment direction of the respective filter element 9, 16, are arranged downstream of the respective filter chamber 8, 15. This makes it possible to heat the respective filter element 9, 16, especially after renewing its active filter surface, to a temperature value selected from a temperature value range with a lower limit of 20 °C above room temperature, in particular the melting temperature of the respective melt, and an upper limit of 400 °C, in particular the respective processing temperature or slightly above the respective processing temperature, after being passed through the respective filter chamber 8, 15. This prevents the respective filter element 9, 16 from cooling and solidifying too quickly before it is wound up.

The heating of the filter surface described above can also be used here, so that any material still adhering remains in a molten state and can flow downwards. Furthermore, the flowing off of the material can be supported by attaching a scraper and guiding the filter surface over this scraper.

In order to be able to determine the respective prevailing pressure conditions of the liquid and/or melt in each of the filter devices 5 and 6, at least one separate pressure sensor 31 can be arranged in each of the inlet channels 7 and 14. However, it would also be possible to use a separate pressure sensor 31 in each of the filter chambers 8 and 15 on the side facing the respective inlet channel 7, 14. For the sake of simplicity, all pressure sensors 31 are provided with the same reference number. By this provision, the pressure built up in the liquid and/or melt can be determined and transmitted or forwarded to a control device 32. Based on the determined pressure ratios, it is possible to determine at which a change of the active filter surface in the respective filter device 5 or 6 is to be carried out.

Depending on the pressure level determined in each case, it is possible to draw conclusions about the condition and contamination of the respective filter element 9, 16. The more particles have been filtered out of the liquid and/or melt by the respective filter element 9, 16 and thus deposited on the filter element 9, 16, the more the passage rate of the liquid and/or melt through the filter element 9, 16 decreases and the pressure upstream of the respective filter element 9, 16 increases or rises. At a predetermined pressure level in the respective filter device 5, 6, the previously described change or renewal of the active filter surface must be carried out.

If the liquid and/or melt to be filtered is one with a very low viscosity, such as, for example, a secondary plastic material such as PET-C, the support of the respective filter element 9, 16 in the respective filter chamber 8, 15 can be dispensed with. However, an arrangement or provision of a first support element 33 in the first filter device 5 and/or of a second support element 34 in the second filter device 6 would also be conceivable and possible. The respective support element 33, 34 is penetrated in a known manner by passage openings through which the filtered liquid and/or melt flows on in the direction of the common discharge channel 4. It would also be possible to design the support element 33, 34 as a support sieve. In this case, it would be conceivable to arrange the support element 33, 34 designed as a support sieve in a stationary position with respect to the respective filter chamber 8, 15. Regardless of this, however, the support sieve could also be moved along with the respective filter element 9, 16 each time the filter is changed.

It would also be possible to design the respective filter element 9, 16 in one or multiple layers. This means, for example, that the filter tier or filter layer closer to the supply channel 3 can be somewhat coarser-pored in order to filter out contaminants with a larger particle size. The further filter tier or filter layer arranged downstream in the direction of flow should be designed with finer pores in order to be able to catch and retain contaminants with a smaller particle size. A more detailed description of an unwinding device and a winding device has been omitted. These can be selected and used in accordance with the known prior art.

As described above for the renewal of one of the active filter surfaces, a minimum proportion of liquid and/or melt is always fed to the filter chamber 8, 15, even when the clamping device 12, 13 or 19, 20 is open. This is also the case when the clamping devices 12, 13 or 19, 20 are open. In order to enable the liquid and/or melt that continues to be supplied to be discharged from the respective filter chamber 8, 15 and the clamping device 12 and/or 13 and/or 19 and/or 20 that is not in the clamping position, at least one separate discharge channel 35 must be provided in the housing 2. For the sake of simplicity, the same reference number was used for each of the discharge channels 35. Thus, after opening of the clamping device 12, 13 or 19, 20 forming a clamping unit 10, 17, the minimum proportion of liquid and/or melt can flow out between the respective clamping element 21 and the filter element 9 or 16.

As further indicated in the schematic diagram in FIG. 3, a separate actuator 36 is provided in each of the inlet channels 7, 14 and in each of the outlet channels 11, 18 in order to adjust and control the respective proportion of liquid and/or melt to the respective filter chambers 8, 15. The adjustment direction for each of the actuators 36 is indicated by a double arrow. It is shown here that the first filter device 5 is fully in filter mode and the second filter device 6 is not in filter mode. In this position of the actuators 36, the first filter device 5 is fed a proportion of slightly below 100% or the entire proportion of 100% of liquid and/or melt and, during the renewal of the active filter surface, only a small proportion of a few percent, in this case of the second filter element 16, is supplied.

FIG. 6 shows a further and possibly independent embodiment of the filter devices 5 and 6 with their channel layout for forming the filtration system 1 in a schematically simplified form, whereby the same reference numbers or component designations are used for the same parts as in the preceding FIGS. 1 to 5. To avoid unnecessary repetition, reference is made to the detailed description in the preceding FIGS. 1 to 5.

In contrast to the variant shown in FIG. 3, a control valve 37 is already provided here in the supply channel 3 in the transition section to the inlet channels 7, 14, by means of which, depending on the position of the same, the mass flow or the volume flow of the liquid and/or melt to be filtered can be proportionally adjusted and fed to the filter devices 5 and/or 6. The control can be carried out by means of the control device 32 in order to set the corresponding switching position and proportional distribution of the liquid and/or melt. The representation of the control valve 37 is purely schematic and can be freely selected according to the known prior art. Furthermore, it is indicated by means of arrows that, in this selected switching position, the largest proportion of liquid and/or melt is fed to the first filter device 5 and a rather small proportion is fed to the second filter device 6.

As already explained, the control valve 37 can be controlled by the control device 32. Alternatively or additionally, the actuators 36 can be controlled by the control device 32. Both the control valve 37 and the actuators 36, individually or together, can be used to adjust the mass flow or the volume flow of the liquid and/or melt to be filtered.

It should be noted that if the control valve 37 is designed as a simple distribution valve, only the distribution of the liquid and/or melt flowing through the supply channel 3 to the two inlet channels 7, 14 located downstream thereof can be changed by actuating the control valve 37. The total pressure remains the same, i.e. the liquid and/or melt arriving at the supply channel 3 at a pressure p is distributed to the inlet channels 7, 14 by the control valve 37, whereby the sum of the pressures p1 and p2 prevailing in the inlet channels 7, 14 in turn results in the pressure p. Ideally, the control valve 37 has the option of stopping the flow to each of the two inlet channels 7, 14 individually.

Contamination of the filter device 5, 6 changes the flow rate of the liquid and/or melt to be filtered, and thus also the pressure in the respective section of the filtration system 1. In order to obtain an optimum flow rate, the pressure of an inlet channel 7 or 14 and the parts of the filtration system 1 downstream thereof can be reduced by actuating the control valve 37. Excessive pressure could damage both the filter devices 5, 6 and other parts of the filtration system 1 and should therefore be avoided.

Alternatively or in addition to the control valve 37, actuators 36 can also be used, which independently of one another change the pressure in each of the inlet channels 7, 14 and/or in each of the outlet channels 11, 18. If only the actuator 36 in the inlet channel 7 or 14 is closed, the pressure downstream of the corresponding actuator 36, e.g. on the filter device 5 or 6 and in the filter chamber 8 or 15, is reduced. If, on the other hand, only the actuator 36 in the outlet channel 11 or 18 is closed, the pressure upstream of the corresponding actuator 36 is increased.

By closing or opening the actuators 36, the proportion of liquid and/or melt supplied into the respective filter chamber 8, 15 can also be reduced. Likewise, this reduction can be brought about by a control valve 37 in the transition section to the inlet channels 7, 14.

As an alternative to manual actuation of the actuator 36 and/or the control valve 37, the control device 32 can also be configured to actuate the actuator 36 and/or the control valve 37.

As explained above, pressure sensors 31 can also be arranged in the filtration system 1. Such pressure sensors 31 can be arranged or provided in each of the inlet channels 7 and 14, in each of the filter chambers 8 and 15 on the side facing the respective inlet channel 7, 14, or also in other parts of the filtration system 1, such as upstream of the supply channel 3, downstream of the discharge channel 4, in one or both of the outlet channels 11, 18, etc.

The control device 32 can be configured to monitor the pressures determined by the pressure sensors 31. The control device 32 can also be configured to control the actuators 36 and/or the control valve 37 in such a way that the pressures remain within predetermined limits.

Examples of limits that must be observed are, for example, maximum or minimum pressures in the supply channel 3, discharge channel 4, inlet channels 7, 14, outlet channels 11, 18 and filter devices 5, 6.

Another option is that the control device 32 uses machine learning to control the actuators 36 and/or the control valve 37 in such a way that particularly high pressures, e.g. pressure peaks, do not occur at all. For this purpose, a trained model can be used, but also a self-learning, i.e. self-training model, which, on the basis of the pressures determined by the various pressure sensors 31, material parameters of the liquid and/or melt to be processed, and control parameters of the actuators 36 and/or the control valve 37, recognizes or learns to recognize how the pressure curves at the individual pressure sensors 31 develop before a pressure peak occurs. Here, the control device 32 can then proactively control the actuators 36 and/or the control valve 37 already at the beginning of such a development in such a way that the pressures remain within predetermined limits, i.e. pressure peaks cannot occur in the first place.

This is particularly advantageous because such pressure peaks usually occur very quickly, i.e. a normal detection of the pressures and reaction to a pressure increase is not sufficient in such cases to avoid the occurrence of pressure peaks. However, a control device 32 that monitors the pressures using the machine learning can learn to recognize how the pressure curves develop before the drastic increases in one of the pressures occur, and thus avoid the increase in pressure in advance by activating the actuators 36 and/or the control valve 37.

As already explained above, the liquid and/or melt can, for example, be a polymer, in particular a plastic, and/or a pasty material. The material can also be, in particular, the melted secondary plastic material described in detail above.

Finally, it should also be mentioned that the individual method steps and their chronological sequence do not necessarily have to be carried out in the order stated, but that a chronological sequence deviating from this is also possible. However, a successive and thus consecutive chronological sequence of the listed method steps is preferred.

The embodiment examples show possible embodiment variants, whereby it should be noted at this point that the invention is not limited to the specifically illustrated embodiment variants thereof, but rather various combinations of the individual embodiment variants with one another are also possible and this variation possibility lies within the ability of the person skilled in the art working in this technical field due to the teaching on technical action by the present invention.

The scope of protection is determined by the claims. However, the description and the drawings must be used to interpret the claims. Individual features or combinations of features from the various embodiments shown and described may constitute independent inventive solutions. The problem underlying the independent inventive solutions can be taken from the description.

All indications of value ranges in the present description are to be understood as including any and all subranges thereof, e.g. the indication 1 to 10 is to be understood as including all subranges, starting from the lower limit 1 and the upper limit 10, i.e. all subranges start with a lower limit of 1 or greater and end with an upper limit of 10 or less, e.g. 1 to 1.7, or 3.2 to 8.1, or 5.5 to 10.

Finally, for the sake of order, it should be noted that some elements have been shown out of scale and/or enlarged and/or reduced in size to make the layout easier to understand.

| List of reference numbers | |
|---|---|
| 1 | filtration system |
| 2 | housing |
| 3 | supply channel |
| 4 | discharge channel |
| 5 | first filter device |
| 6 | second filter device |
| 7 | first inlet channel |
| 8 | first filter chamber |
| 9 | first filter element |
| 10 | first clamping unit |
| 11 | first outlet channel |
| 12 | first clamping device |
| 13 | second clamping device |
| 14 | second inlet channel |
| 15 | second filter chamber |
| 16 | second filter element |
| 17 | second clamping unit |
| 18 | second outlet channel |
| 19 | third clamping device |
| 20 | fourth clamping device |
| 21 | clamping element |
| 22 | actuating element |
| 23 | clamping element contact surface |
| 24 | actuating element contact surface |
| 25 | first guide arrangement |
| 26 | second guide arrangement |
| 27 | first heating device |
| 28 | first heating device |
| 29 | second heating device |
| 30 | second heating device |
| 31 | pressure sensor |
| 32 | control device |
| 33 | first support element |
| 34 | second support element |
| 35 | discharge channel |
| 36 | actuator |
| 37 | control valve |

The invention claimed is:

1. A method for the filtration of liquids and/or melts with impurities contained therein, by means of a filtration system (1), in which the following steps are carried out providing a housing (2) with a common supply channel (3) and a common discharge channel (4), providing a first filter device (5) with a first inlet channel (7), a first filter chamber (8), a band-shaped first filter element (9) passed through the first filter chamber (8), a first clamping unit (10) and a first outlet channel (11), wherein the first inlet channel (7) is in flow connection with the common supply channel (3) and the first outlet channel (11) is in flow connection with the common discharge channel (4), and wherein the first filter element (9), viewed in the adjustment direction of the first filter element (9), is held clamped on both sides of the first filter chamber (8) by means of a first and second clamping device (12, 13) of the first clamping unit (10), providing a second filter device (6) with a second inlet channel (14), a second filter chamber (15), a band-shaped second filter element (16) passed through the second filter chamber (15), a second clamping unit (17) and a second outlet channel (18), wherein the second inlet channel (14) is in flow connection with the common supply channel (3) and the second outlet channel (18) is in flow connection with the common discharge channel (4), and wherein the second filter element (16), viewed in the adjustment direction of the second filter element (16), is held clamped on both sides of the second filter chamber (15) by means of a third and fourth clamping device (19, 20) of the second clamping unit (17), providing the liquid and/or melt to be filtered in a flowable aggregate state and feeding the liquid and/or melt into the common supply channel (3), wherein the liquid and/or melt is conveyed through at least one of the filter devices (5, 6) to the common discharge channel (4) and being filtered in the process, wherein each of the clamping devices (12, 13; 19, 20) of the first clamping unit (10) and the second clamping unit (17) respectively comprises a clamping element (21) and an actuating element (22) interacting therewith, each of the clamping elements (21) is guided in a normal direction onto a flat side of the respective filter element (9, 16) in an adjustable manner relative to the housing (2) and is arranged in a transverse orientation with respect to the adjustment direction of the respective filter element (9, 16), each of the actuating elements (22) is guided in a parallel direction with respect to the flat side of the respective filter element (9, 16) in an adjustable manner relative to the housing (2) and is also arranged in a transverse orientation with respect to the adjustment direction of the respective filter element (9, 16), the clamping elements (21) each have a clamping element contact surface (23) on their side facing the respective actuating element (22), the actuating elements (22) each have an actuating element contact surface (24) on their side facing the respective clamping element (21), the respectively interacting and mutually facing clamping element contact surfaces (23) and actuating element contact surfaces (24) are aligned so as to extend diametrically opposite to one another and the respective clamping element contact surfaces (23) and the actuating element contact surfaces (24) furthermore have an oblique longitudinal orientation with respect to the flat side of the respective filter element (9, 16), and upon a relative adjustment of the actuating element (22) in a first adjustment direction with respect to the clamping element (21) interacting therewith, the clamping element (21) is pressed against the housing (2) into a clamping position resting against the respective filter element (9, 16) and in a second adjustment direction of the actuating element (22), which is opposite to the first adjustment direction, the clamping element (21) interacting therewith is adjusted into a release position for the respective filter element (9, 16).

2. The method according to claim 1, wherein the clamping elements (21) and actuating elements (22) are held and guided against each other in a longitudinally adjustable manner in the region of their clamping element contact surfaces (23) and actuating element contact surfaces (24) by means of a first guide arrangement (25).

3. The method according to claim 1, wherein the respective actuating elements (22) are held and guided in a longitudinally adjustable manner on the housing (2) on their side facing away from the respective filter element (9, 16) by means of a second guide arrangement (26).

4. The method according to claim 1, wherein the clamping elements (21), viewed towards their clamping surface facing the respective filter element (9, 16), are circumferentially sealed against the housing (2).

5. The method according to claim 1, wherein each of the clamping devices (12, 13; 19, 20) of the clamping units (10, 17) is adjusted independently of one another between its clamping position and its release position.

6. The method according to claim 1, wherein when the clamping elements (21) are in the clamping position, the respective filter chamber (8, 15) is sealed against the housing (2).

7. The method according to claim 1, wherein during filter operation of the filtration system (1) at least a proportion of 10% of the liquid and/or melt is always conveyed in one of the inlet channels (7, 14) and the remaining proportion to 100% of the liquid and/or melt is conveyed in the other inlet channel (14, 7).

8. The method according to claim 1, wherein when renewing the active filter surface of one of the filter elements (9, 16), the following steps are carried out

- reducing the proportion of liquid and/or melt supplied into the respective filter chamber (8, 15) to a maximum of 2% of the total mass flow/volume flow or completely preventing the supply of liquid and/or melt into the respective filter chamber (8, 15),
- adjusting the respective clamping devices (12, 13; 19, 20) of the respective clamping unit (10, 17) into their release position,
- moving the respective filter element (9, 16) in its adjustment direction by a predetermined adjustment range through the respective filter chamber (8, 15),
- adjusting one of the two clamping devices (12, 13; 19, 20) of the respective clamping unit (10, 17) into its clamping position,
- pretensioning the respective filter element (9, 16) with a predetermined tensile force in the direction of the other of the two clamping devices (13, 12; 20, 19) of the respective clamping unit (17, 10),
- adjusting the other of the two clamping devices (13, 12; 20, 19) of the respective clamping unit (17,10) into its clamping position, and
- releasing the supply of the liquid and/or melt into the respective filter chamber (8, 15) with the renewed filter surface of the respective filter element (9, 16).

9. The method according to claim 1, wherein the reduction of the proportion of liquid and/or melt fed into the respective filter chamber (8, 15) by actuators (36) in each of the inlet channels (7, 14) and/or in each of the outlet channels (11, 18) or through a control valve (37) in the transition section to the inlet channels (7, 14) is effected.

10. The method according to claim 9, wherein the actuators (36) and/or the control valve (37) are controllable by a control device (32).

11. The method according to claim 8, wherein the tensile force applied to the respective filter element (9, 16) during renewal of its active filter surface is determined and/or monitored.

12. The method according to claim 8, wherein the respective filter element (9, 16) is heated to a temperature value selected from a temperature value range having a lower limit of 20 °C above room temperature and an upper limit of 400 °C before being fed into the respective filter chamber (8, 15).

13. The method according to claim 8, wherein the respective filter element (9, 16) is heated to a temperature value selected from a temperature value range with a lower limit of 20 °C above room temperature and an upper limit of 400 °C after being passed through the respective filter chamber (8, 15).

14. The method according to claim 1, wherein in each of the inlet channels (7, 14) and/or in each of the filter chambers (8, 15) on the side facing the respective inlet channel (7, 14), the pressure built up in the liquid and/or melt is determined by pressure sensors (31).

15. The method according to claim 10, wherein the control device (32) is configured to monitor the pressure acquired by the pressure sensors (31), and to control the actuators (36) and/or the control valve (37) in such a way that the pressures remain within predetermined limits.

16. The method according to claim 15,

- wherein in each of the inlet channels (7, 14) and/or in each of the filter chambers (8, 15) on the side facing the respective inlet channel (7, 14), the pressure built up in the liquid and/or melt is determined by pressure sensors (31), and
- wherein the control device (32) is configured, using machine learning on the basis of the pressures determined by the pressure sensors (31), material parameters of the liquid and/or melt to be processed, and control parameters of the actuators (36) and/or the control valve (37), to proactively control the actuators (36) and/or the control valve (37) in such a way that the pressures remain within predetermined limits.

17. The method according to claim 1, wherein the liquid or the melt is a polymer and/or a pasty material.

18. A filtration system (1) for filtration of liquids and/or melts with impurities contained therein for carrying out the filtration method according to claim 1, the filtration system (1) comprising

- a housing (2) with a common supply channel (3) and a common discharge channel (4),
- a first filter device (5) with a first inlet channel (7), a first filter chamber (8), a band-shaped first filter element (9) passed through the first filter chamber (8), a first clamping unit (10) and a first outlet channel (11), wherein the first inlet channel (7) is in flow connection with the common supply channel (3) and the first outlet channel (11) is in flow connection with the common discharge channel (4), and wherein the first filter element (9), viewed in the adjustment direction of the first filter element (9), is held clamped on both sides of the first filter chamber (8) by means of a first and second clamping device of the first clamping unit (10),
- a second filter device (6) with a second inlet channel (14), a second filter chamber (15), a band-shaped second filter element (16) passed through the second filter chamber (15), a second clamping unit (17) and a second outlet channel (18), wherein the second inlet channel (14) is in flow connection with the common supply channel (3) and the second outlet channel (18) is in flow connection with the common discharge channel (4), and wherein the second filter element (16), viewed in the adjustment direction of the second filter element (16), is held clamped on both sides of the second filter chamber (15) by means of a third and fourth clamping device of the second clamping unit (17), wherein each of the clamping devices (12, 13; 19, 20) of the first clamping unit (10) and the second clamping unit (17) comprises a clamping element (21) and an actuating element (22) interacting therewith, each of the clamping elements (21) is guided in a normal direction onto a flat side of the respective filter element (9, 16) in an adjustable manner relative to the housing (2) and is arranged in a transverse orientation with respect to the adjustment direction of the respective filter element (9, 16), each of the actuating elements (22) is guided in a parallel direction with respect to the flat side of the respective filter element (9, 16) so as to be adjustable relative to the housing (2) and is also arranged in a transverse orientation with respect to the adjustment direction of the respective filter element (9, 16), the clamping elements (21) each have a clamping element contact surface (23) on their side facing the respective actuating element (22)

the actuating elements (22) each have an actuating element contact surface (24) on their side facing the respective clamping element (21), the respectively interacting and mutually facing clamping element contact surfaces (23) and actuating element contact surfaces (24) are aligned so as to extend diametrically opposite to one another and the respective clamping element contact surfaces (23) and the actuating element contact surfaces (24) furthermore have an oblique longitudinal orientation with respect to the flat side of the respective filter element (9, 16), and when the actuating element (22) is relatively adjusted in a first adjustment direction with respect to the clamping element (21) interacting therewith, the clamping element (21) is pressed against the housing (2) into a clamping position resting against the respective filter element (9, 16) and when the actuating element (22) is adjusted in a second adjustment direction opposite to the first adjustment direction, the clamping element (21) interacting therewith can be adjusted into a release position for the respective filter element (9, 16).

19. The filtration system (1) according to claim 18, wherein the interacting clamping elements (21) and actuating element (22) are held and guided against each other in a longitudinally adjustable manner in the region of their clamping element contact surfaces (23) and actuating element contact surfaces (24) by means of a first guide arrangement (25).

20. The filtration system (1) according to claim 18, wherein the respective actuating elements (22) are held and guided in a longitudinally adjustable manner on the housing (2) on their side facing away from the respective filter element (9, 16) by means of a second guide arrangement (26).

21. The filtration system (1) according to claim 18, wherein the clamping elements (21), viewed towards their clamping surface facing the respective filter element (9, 16), are circumferentially sealed against the housing (2).

22. The filtration system (1) according to claim 18, wherein each of the clamping devices (12, 13; 19, 20) of the clamping units (10, 17) is in drive connection with its own actuating drive.

23. The filtration system (1) according to claim 18, further comprising actuators (36) in each of the inlet channels (7, 14) and/or in each of the outlet channels (11, 18) and/or a control valve (37) in the transition section to the inlet channels (7, 14), wherein the actuators (36) and/or the control valve (37) can limit the proportion of liquid and/or melt fed into the respective filter chamber (8, 15).

24. The filtration system (1) according to claim 18, further comprising a control device (32), wherein the control device (32) controls the actuators (36) and/or the control valve (37).

25. The filtration system (1) according to claim 18, wherein a first heating device (27, 28) is provided for each of the filter elements (9, 16), and each of the first heating devices (27, 28) is arranged upstream of the respective filter chamber (8, 15) as viewed in the adjustment direction of the respective filter element (9, 16).

26. The filtration system (1) according to claim 18, wherein a second heating device (29, 30) is provided for each of the filter elements (9, 16), and each of the second heating devices (29, 30) is arranged downstream of the respective filter chamber (8, 15) as viewed in the adjustment direction of the respective filter element (9, 16).

27. The filtration system (1) according to claim 18, wherein at least one pressure sensor (31) is arranged or accommodated in each of the inlet channels (7, 14) and/or in each of the filter chambers (8, 15) on the side facing the respective inlet channel (7, 14), and the pressure sensors (31) are configured to determine the pressure built up in the liquid and/or melt.

28. The filtration system (1) according to claim 18, further comprising a control device (32), wherein the control device (32) is configured to monitor the pressures determined by the pressure sensors (31) and to control the actuators (36) and/or the control valve (37) in such a way that the pressures remain within predetermined limits.

29. The filtration system (1) according to claim 18, further comprising a control device (32), wherein the control device (32) is configured, using machine learning on the basis of the pressures determined by the pressure sensors (31), material parameters of the liquid and/or melt to be processed, and control parameters of the actuators (36) and/or the control valve (37), to proactively control the actuators (36) and/or the control valve (37) in such a way that the pressures remain within predetermined limits.

30. The filtration system (1) according to claim 18, wherein the liquid or the melt is a polymer and/or a pasty material.

* * * * *